United States Patent
Kim

(10) Patent No.: US 12,456,918 B2
(45) Date of Patent: Oct. 28, 2025

(54) BI-DIRECTIONAL HIGH VOLTAGE DC-DC CONVERTER CAPABLE OF DETECTING AND AVOIDING BYPASS AND OPERATING METHOD THEREOF

(71) Applicant: HL MANDO CORPORATION, Gyeonggi-do (KR)

(72) Inventor: Jeehoon Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 194 days.

(21) Appl. No.: 18/199,368

(22) Filed: May 19, 2023

(65) Prior Publication Data

US 2024/0258907 A1    Aug. 1, 2024

(30) Foreign Application Priority Data

Jan. 31, 2023  (KR) ........................ 10-2023-0012771

(51) Int. Cl.
| | |
|---|---|
| *H02M 1/32* | (2007.01) |
| *B60L 3/00* | (2019.01) |
| *B60L 53/22* | (2019.01) |
| *B60L 58/30* | (2019.01) |
| *B60L 50/75* | (2019.01) |

(52) U.S. Cl.
CPC ............. *H02M 1/32* (2013.01); *B60L 3/0023* (2013.01); *B60L 53/22* (2019.02); *B60L 58/30* (2019.02); *B60L 50/75* (2019.02); *B60L 2210/10* (2013.01)

(58) Field of Classification Search
CPC ............... H02M 1/32–348; B60L 3/00; B60L 3/0023–0084; B60L 3/04; B60L 50/70–75; B60L 58/30–40; B60L 2210/10–14

See application file for complete search history.

(56) References Cited

U.S. PATENT DOCUMENTS

| | | | |
|---|---|---|---|
| 2004/0065489 A1* | 4/2004 | Aberle | B60W 10/26 180/65.1 |
| 2017/0279264 A1* | 9/2017 | Li | B60L 58/20 |
| 2023/0078292 A1* | 3/2023 | Nakamura | B60L 8/003 320/101 |
| 2023/0086600 A1* | 3/2023 | Twelkemeijer | H02M 1/0003 323/205 |

FOREIGN PATENT DOCUMENTS

| | | | | |
|---|---|---|---|---|
| CN | 114447888 A | * | 5/2022 | H02H 3/027 |
| KR | 10-2021-0153187 | | 12/2021 | |

OTHER PUBLICATIONS

Office Action dated Jul. 10, 2024 for Korean Patent Application No. 10-2023-0012771 and its English translation provided by Applicant's foreign counsel.

* cited by examiner

*Primary Examiner* — Rexford N Barnie
*Assistant Examiner* — David A Shiao
(74) *Attorney, Agent, or Firm* — WOMBLE BOND DICKINSON (US) LLP

(57) ABSTRACT

A bi-directional high voltage DC-DC converter capable of detecting and avoiding a bypass and an operating method thereof, by detecting whether a bypass has occurred and performing an operation for avoiding the bypass and/or an operation for coping with the bypass when the occurrence of the bypass is detected, can detect the occurrence of the bypass to avoid system defects, and detect the occurrence of the bypass in an existing system without adding a voltage sensor and a current sensor.

17 Claims, 7 Drawing Sheets

BI-DIRECTIONAL HIGH VOLTAGE DC-DC CONVERTER CAPABLE OF DETECTING AND AVOIDING BYPASS AND OPERATING METHOD THEREOF

CROSS REFERENCE TO RELATED APPLICATION

This application claims priority from and benefits of Korean Patent Application No. 10-2023-0012771, filed on Jan. 31, 2023, which is hereby incorporated by reference for all purposes as if fully set forth herein.

TECHNICAL FIELD

The present disclosure generally relates to a bi-directional high voltage DC-DC converter capable of detecting and avoiding a bypass and an operating method thereof, and more particularly, to a bi-directional high voltage DC-DC converter that is installed in a fuel cell electric vehicle (FCEV) and charges a high voltage battery to supply power to a motor.

BACKGROUND

A bi-directional high voltage DC-DC converter (BHDC) used in a fuel cell electric vehicle can charge a high voltage battery to supply power to a motor.

However, when a bypass occurs in a conventional bi-directional high voltage DC-DC converter, a controller associated with a power system may be damaged. In this case, the bypass of the bi-directional high voltage DC-DC converter may indicate a case where an output current required for voltage control becomes greater than a current limit command, and may refer to a phenomenon in which an input voltage of the bi-directional high voltage DC-DC converter is greater than an output voltage of the bi-directional high voltage DC-DC converter, so current control is unfeasible and/or overcurrent occurs.

Accordingly, it is necessary to develop a device and method for detecting whether a bypass occurs in the bi-directional high voltage DC-DC converter and taking appropriate measures when the bypass occurs.

SUMMARY

In view of the above, some embodiments of the present disclosure may provide a bi-directional high voltage DC-DC converter and an operating method which are capable of detecting and avoiding a bypass, and detect whether the bypass has occurred and perform an operation for avoiding the bypass and an operation for coping with the bypass when the occurrence of the bypass is detected.

Other objects not specified in the present disclosure may be additionally considered within the scope that can be easily inferred from the following detailed description and effects thereof.

A bi-directional high voltage DC-DC converter (BHDC) according to a preferred embodiment of the present disclosure is a bi-directional high voltage DC-DC converter to be connected to a fuel cell control unit (FCU) installed in a fuel cell electric vehicle (FCEV), which includes: a conversion circuit for converting a voltage; and a control circuit for detecting whether a bypass in which current control of the bi-directional high voltage DC-DC converter is unfeasible and overcurrent occurs has occurred, based on an input voltage and an output voltage of the bi-directional high voltage DC-DC converter.

The control circuit may determine that the bypass has occurred when a value obtained by subtracting the input voltage from the output voltage is less than a preset first reference value.

The control circuit may perform an operation to avoid the bypass when the occurrence of the bypass is detected.

The control circuit may obtain a second current limiting command using a bypass avoidance value based on a first current limiting command received from the fuel cell control unit, and control an operation of the conversion circuit based on the second current limiting command.

The control circuit may obtain the second current limiting command by adding the bypass avoidance value to the first current limiting command.

The control circuit may obtain the bypass avoidance value based on the first current limiting command.

The control circuit may obtain the bypass avoidance value using at least one of the input voltage of the bi-directional high voltage DC-DC converter, the output voltage of the bi-directional high voltage DC-DC converter, a temperature of the bi-directional high voltage DC-DC converter, and an output current of a high voltage battery connected to the bi-directional high voltage DC-DC converter, and an output current of the bi-directional high voltage DC-DC converter.

When the occurrence of the bypass is detected, the control circuit may perform an operation to avoid the bypass when a value obtained by subtracting the input voltage from the output voltage is less than a preset second reference value, and the second reference value may be equal to or smaller than the first reference value.

When the occurrence of the bypass is detected, the control circuit may perform an operation to cope with the bypass.

In this case, the control circuit may turn off the operation of the bi-directional high voltage DC-DC converter, store a data trouble code (DTC), and provide a BHDC operation off signal and a main relay off request signal to the fuel cell control unit to perform the operation to cope with the bypass.

The control circuit may perform the operation to cope with the bypass when the occurrence of the bypass is detected more than a preset reference number of times.

When the occurrence of the bypass is detected, the control circuit may perform the operation to cope with the bypass when the value obtained by subtracting the input voltage from the output voltage is less than a preset third reference value, and the third reference value may be equal to or less than the first reference value and equal to or greater than the second reference value.

After the occurrence of the bypass is detected, the control circuit may detect whether the bypass is released or not.

In this case, the control circuit may determine that the bypass is released when the value obtained by subtracting the input voltage from the output voltage exceeds a preset fourth reference value after the occurrence of the bypass is detected, and the fourth reference value may be equal to or greater than the first reference value.

When the occurred bypass is released, the control circuit may turn on the operation of the bi-directional high voltage DC-DC converter, transmit a BHDC operation on signal and a main relay on request signal to the fuel cell control unit, and control an operation of the conversion circuit based on the first current limit command provided from the fuel cell control unit.

An operating method of a bi-directional high voltage DC-DC converter (BHDC) according to a preferred embodiment of the present disclosure is an operating method of a bi-directional high voltage DC-DC converter (BHDC) connected to a fuel cell control unit (FCU) installed in a fuel cell electric vehicle (FCEV), the operating method including: obtaining an input voltage and an output voltage of the bi-directional high voltage DC-DC converter; and detecting, based on the input voltage and the output voltage, whether a bypass in which current control of the bi-directional high voltage DC-DC converter is unfeasible and overcurrent occurs has occurred.

The detecting whether a bypass has occurred may include determining that the bypass has occurred when a value obtained by subtracting the input voltage from the output voltage is less than a preset first reference value.

The operating method may further include performing an operation to avoid the bypass when the occurrence of the bypass is detected.

The performing of the operation to avoid the bypass may include: obtaining a second current limiting command by using a bypass avoidance value based on a first current limiting command received from the fuel cell control unit; and controlling the operation of the bi-directional high voltage DC-DC converter based on the second current limiting command.

The performing of the operation to avoid the bypass may include, when the occurrence of the bypass is detected, performing the operation to avoid the bypass when the value obtained by subtracting the input voltage from the output voltage is less than a preset second reference value, and the second reference value may be equal to or smaller than the first reference value.

According to the bi-directional high voltage DC-DC converter capable of detecting and avoiding a bypass and the operating method thereof according to exemplary embodiments of the present disclosure, by detecting whether the bypass has occurred and performing an operation for avoiding the bypass and an operation for coping with the bypass when the occurrence of the bypass is detected, it is possible to detect the occurrence of the bypass to avoid system defects, and the occurrence of the bypass can be detected in an existing system without adding a voltage sensor and a current sensor.

The effects of the present disclosure are not limited to the effects mentioned above, and other effects not mentioned will be clearly understood by those skilled in the art from the description below.

DETAILED DESCRIPTION

Figure 1:
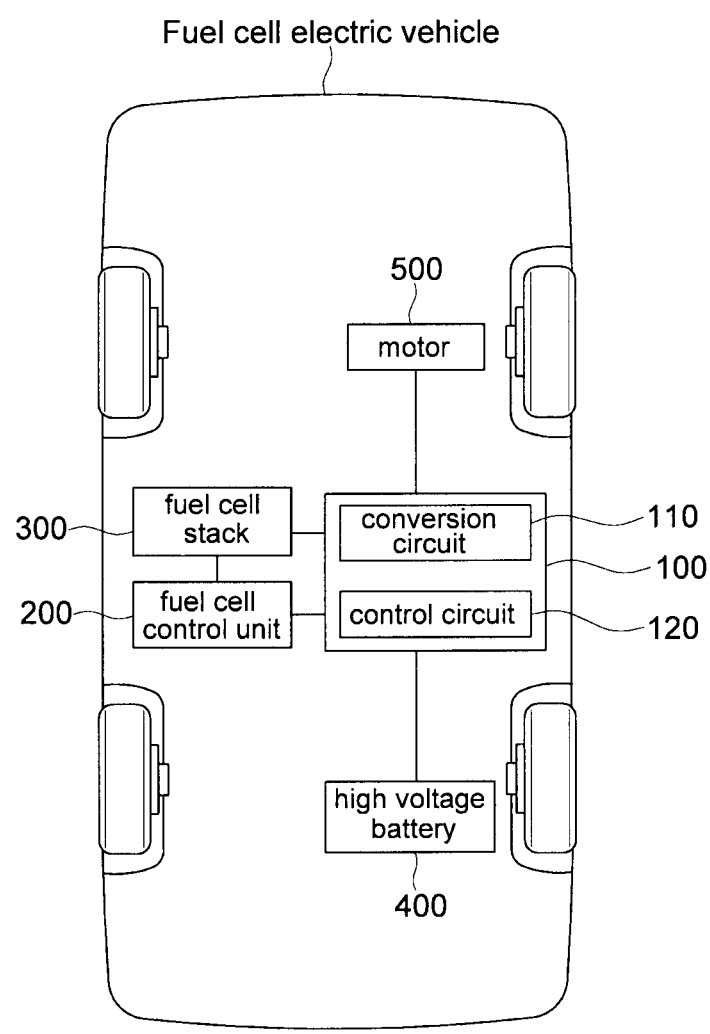
FIG. 1 is a block diagram for illustrating a bi-directional high voltage DC-DC converter capable of detecting and avoiding a bypass according to an exemplary embodiment of the present disclosure.

Hereinafter, embodiments of the present disclosure will be described in detail with reference to the accompanying drawings. Advantages and features of the present disclosure, and methods of achieving them, will become clear with reference to the embodiments that are described in detail below in conjunction with the accompanying drawings. However, the present disclosure is not limited to the embodiments disclosed below, but may be implemented in various forms different from each other, and only the present embodiments are provided to make the disclosure of the present disclosure complete, and to completely inform those skilled in the art to which the present disclosure pertains of the scope of the present disclosure. The present disclosure is only defined by the scope of the claims. Like reference numbers designate like components throughout the present specification.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless specifically defined explicitly.

In the present specification, terms such as "first", "second", and the like are used to distinguish one component from another, and the scope of the present disclosure should not be limited by these terms. For example, a first component may be termed a second component, and similarly, the second component may be termed the first component.

In the present specification, identification codes (e.g., a, b, c, etc.) for each step are used for convenience of explanation, and identification codes do not describe the order of each step, and each step may occur in a different order from the specified order unless a specific order is clearly stated in context. That is, the respective steps may occur in the order as specified, may be performed substantially simultaneously, or may be performed in the reverse order.

In the present specification, expressions such as "has", "may have", "includes" or "may include" indicate the existence of a corresponding feature (e.g., numerical value, function, operation, or component such as a part), and do not preclude the presence of additional features. In addition, the term '. . . unit' described in the present specification means software or a hardware component such as a field-programmable gate array (FPGA) or ASIC, and '. . . unit' performs certain roles. However, '. . . unit' is not limited to software or hardware. '. . . unit' may be configured to be in an addressable storage medium and may be configured to reproduce one or more processors. Accordingly, as an example, '. . . unit' refers to components such as software components, object-oriented software components, class components, and task components, processes, functions, properties, procedures, subroutines, segments of program code, drivers, firmware, microcode, circuits, data structures and variables. Components and functions provided within '. . . units' may be combined into smaller numbers of components and '. . . units' or may be further separated into additional components and '. . . units'.

Hereinafter, preferred embodiments of a bi-directional high voltage DC-DC converter capable of detecting and avoiding a bypass and an operating method thereof according to the present disclosure will be described in detail with reference to the accompanying drawings.

First, a bi-directional high voltage DC-DC converter capable of detecting and avoiding a bypass according to an exemplary embodiment of the present disclosure will be described with reference to FIGS. 1 and 2.

Figure 2:
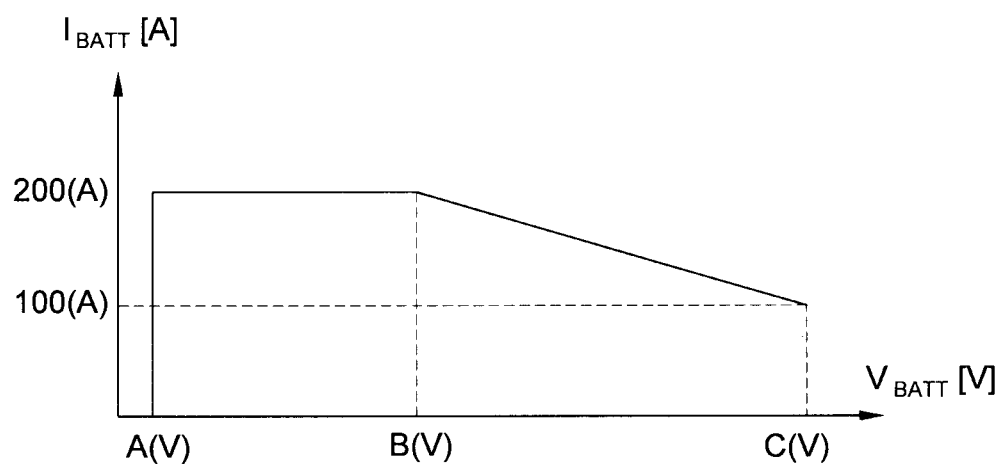
FIG. 2 is a graph for showing an example of a bypass avoidance value according to an exemplary embodiment of the present disclosure.

FIG. 1 is a conceptual block diagram of a fuel cell electric vehicle comprising a bi-directional high voltage DC-DC converter capable of detecting and avoiding a bypass according to an exemplary embodiment of the present disclosure, and FIG. 2 is a graph for showing an example of a bypass avoidance value according to an exemplary embodiment of the present disclosure.

Referring to FIG. 1, the bi-directional high voltage DC-DC converter capable of detecting and avoiding a bypass (hereinafter referred to as a 'bi-directional high voltage DC-DC converter') 100 according to the exemplary embodiment of the present disclosure may be installed in a fuel cell electric vehicle (FCEV) and may be configured to charge a high voltage battery 400 to supply power to a motor 500.

For example, the bi-directional high voltage DC-DC converter (BHDC) 100 may be connected to a fuel cell control unit (FCU) or controller 200, a fuel cell stack 300, the high voltage battery 400, the motor 500, and one or more components, which can be mounted in the fuel cell electric vehicle to charge the high voltage battery 400 and supply power to the motor 500.

More specifically, the bi-directional high voltage DC-DC converter 100 may step down the power generated by the fuel cell stack 300 and the high voltage generated by regenerative braking, and transmit the stepped down voltage to the high voltage battery 400 to charge the high voltage battery 400. In addition, the bi-directional high voltage DC-DC converter 100 may amplify the voltage of the high voltage battery 400 to transmit power to the motor 500 when the hydrogen fuel cell electric vehicle is driven in an EV (electric vehicle) mode or a HEV (hybrid electric vehicle) mode.

In this exemplary embodiment, the bi-directional high voltage DC-DC converter 100 may detect whether a bypass has occurred, and perform an operation to avoid the bypass and an operation to cope with the bypass when the occurrence of the bypass is detected.

Here, the bypass may refer to, for example, but not limited to, a phenomenon in which current control of the bi-directional high voltage DC-DC converter 100 is unavailable or unfeasible and overcurrent occurs in the bi-directional high voltage DC-DC converter 100. Briefly explaining the procedure in which the bypass occurs, when an input current of the bi-directional high voltage DC-DC converter 100 reaches a current limit command of the fuel cell control unit (FCU) 200, the load of the bi-directional high voltage DC-DC converter 100 may exceed the maximum power, resulting in a decrease in output voltage. Thereafter, the bypass may occur at the point where the output voltage becomes equal to an input voltage, and the current control of the bi-directional high voltage DC-DC converter 100 becomes unavailable or unfeasible. As the occurrence of the bypass accumulates, the pin of a SiC module is discolored, and on-resistance increases, which results in misrecognition of an arm short. In addition, even after a failure of the bi-directional high voltage DC-DC converter 100 is detected, overcurrent protection is unavailable or unfeasible due to the bypass.

Accordingly, an exemplary embodiment of the present disclosure can detect whether the bypass has occurred, thereby avoiding system defects. In addition, an exemplary embodiment of the present disclosure can detect whether the bypass occurs in an existing system without a voltage sensor and a current sensor.

To this end, the bi-directional high voltage DC-DC converter 100 may include a conversion circuit 110 and a control circuit 120.

The conversion circuit 110 may convert a voltage according to the control of the control circuit 120.

The conversion circuit 110 may include, for instance, but not limited to, one or more of a smoothing circuit, a full bridge converter (FBC), a transformer, a full bridge rectifier (FBR), and the like. In addition, the conversion circuit 110 may be configured to step down the power generated by the fuel cell stack 300 and the high voltage generated by regenerative braking, and transfer the stepped down voltage to the high voltage battery 400 to charge the high voltage battery 400, and the conversion circuit 110 may amplify the voltage of the high voltage battery 400 to transmit the power to the motor 500 when the fuel cell electric vehicle is driven in the electric vehicle mode or the hybrid electric vehicle mode.

The control circuit 120 may be configured to detect whether the bypass occurs or is generated based on the input voltage and the output voltage of the bi-directional high voltage DC-DC converter 100.

For instance, the control circuit 120 may detect whether the bypass occurs by comparing a value calculated by subtracting the input voltage of the bi-directional high voltage DC-DC converter 100 from the output voltage of the bi-directional high voltage DC-DC converter 100 with a preset first reference value. For example, when the calculated value is less than the first reference value, the control circuit 120 may determine that the bypass has occurred. However, when the calculated value is equal to or greater than the first reference value, the control circuit 120 may determine that no bypass has occurred. For instance, when it is determined that the bypass has occurred, the control circuit 120 may increase the number of bypass occurrences by adding 1 to a current value of the number of bypass occurrences, and when it is determined that no bypass has occurred, the control circuit 120 may reduce the number of bypass occurrences by subtracting 1 from the current value of the number of bypass occurrences.

In addition, the control circuit 120 may perform an operation to avoid the bypass when the bypass occurrence is detected.

For example, the control circuit 120 may obtain a second command for limiting a current by using a bypass avoidance value based on the first command for limiting the current provided from the fuel cell control unit 200, and control the operation of the conversion circuit 110 based on the second command for limiting the current.

In other words, the control circuit 120 may obtain the second command for limiting the current by increasing the first command for limiting the current using the bypass avoidance value, and control the operation of the conversion circuit 110 using the second command for limiting the current. For example, when the bypass avoidance value is set to a specific value, such as "20 (A)", the control circuit 120 may obtain the second command for limiting the current by adding the bypass avoidance value to the first command for limiting the current. For instance, the second command for limiting the current can be obtained by an equation of "second command for limiting current=first command for limiting a current+bypass avoiding value". In addition, when the bypass avoidance value is set to a specific ratio, such as "10%", the control circuit 120 may obtain the second command for limiting the current by adding a value obtained from the first command for limiting the current using the bypass avoidance value to the first current limiting command. For instance, the second command for limiting the current can be obtained by an equation of "second command for limiting current=first command for limiting current+ (first command for limiting current*bypass avoidance value) ".

The control circuit 120 may obtain the second command for limiting the current within a maximum current limit value. For example, referring to FIG. 2, when the first command for limiting the current is "100 (A)" in a situation where $V_{BATT}$ is "A (V)", the control circuit 120 may obtain the bypass avoidance value of "20 (A)" and obtain the second command for limiting the current of "120 (A)=100 (A)+20 (A)". When the first command for limiting the current is "190 (A)" in a situation where $V_{BATT}$ is "B (V)", the control circuit 120 may obtain the bypass avoidance value of "10 (A)" and obtain the second command for limiting the current of "200 (A)=190 (A)+10 (A)". When the first command for limiting the current is "90 (A)" in a situation where $V_{BATT}$ is "C (V)", the control circuit 120 may obtain the bypass avoidance value of "10 (A)" and obtain the second current limiting command of "100 (A)=90 (A)+10 (A)".

The control circuit 120 may obtain the bypass avoidance value based on the first command for limiting the current. For instance, the control circuit 120 may obtain the bypass avoidance value corresponding to the first command for limiting the current by using bypass avoidance information in which bypass avoidance values are stored for each command for limiting the current. In addition, the control circuit 120 may obtain a bypass avoidance value using at least one of the input voltage of the bi-directional high voltage DC-DC converter 100, the output voltage of the bi-directional high voltage DC-DC converter 100, the temperature of the bi-directional high voltage DC-DC converter 100, the output current of the high voltage battery 400 connected to the bi-directional high voltage DC-DC converter 100, and the output current of the bi-directional high voltage DC-DC converter 100. As a matter of course, the control circuit 120 may obtain the bypass avoidance value using a preset specific value.

In this case, when the occurrence of the bypass is detected, the control circuit 120 may determine whether to perform a bypass avoidance operation for avoiding the bypass based on the input voltage and the output voltage of the bi-directional high voltage DC-DC converter 100.

For instance, the control circuit 120 may compare a value calculated by subtracting the input voltage of the bi-directional high voltage DC-DC converter 100 from the output voltage of the bi-directional high voltage DC-DC converter 100 with a preset second reference value in order to determine whether to perform the bypass avoidance operation. For example, when the calculated value is less than the second reference value, the control circuit 120 may perform the bypass avoidance operation. On the other hand, when the calculated value is greater than or equal to the second reference value, the control circuit 120 may not perform the bypass avoidance operation.

The second reference value may be a value equal to or smaller than the first reference value, that is, "second reference value≤first reference value". For example, when the second reference value is equal to the first reference value, the control circuit 120 may immediately perform the bypass avoidance operation when the occurrence of the bypass is detected. On the other hand, when the second reference value is smaller than the first reference value, even if the control circuit 120 detects the occurrence of the bypass, the control circuit 120 may not immediately perform the bypass avoidance operation, but the control circuit 120 may perform the bypass avoidance operation when the value obtained by subtracting the input voltage of the bi-directional high voltage DC-DC converter 100 from the output voltage of the bi-directional high voltage DC-DC converter 100 is less than the second reference value.

In addition, the control circuit 120 may perform an operation to cope with the bypass when the occurrence of the bypass is detected.

For instance, the control circuit 120 may turn off the operation of the bi-directional high voltage DC-DC converter 100, store a data trouble code (DTC), provide a BHDC operation off signal (i.e. a signal for BHDC operation off or a signal for operation off of the BHDC) and a main relay off request signal (i.e. a signal for requesting main relay off) to the fuel cell control unit 200 to perform the operation to cope with the bypass.

In this case, the control circuit 120 may perform the operation to cope with the bypass when the bypass occurrence is detected more than a preset reference number of times. For example, since it is highly likely that the bi-directional high voltage DC-DC converter 100 is out of order or in an abnormal state when the bypass occurs consistently, it may be determined that the bi-directional high voltage DC-DC converter 100 is out of order or in an abnormal state when the number of the bypass occurrences is greater than or equal to a reference value. Accordingly, the control circuit 120 may perform the operation to cope with the bypass only when the number of the bypass occurrences is greater than or equal to the reference number of times.

Further, when the bypass occurrence is detected, the control circuit 120 may determine whether to perform the operation to cope with the bypass based on the input voltage and the output voltage of the bi-directional high voltage DC-DC converter 100.

For instance, the control circuit 120 may compare a value calculated by subtracting the input voltage of the bi-directional high voltage DC-DC converter 100 from the output voltage of the bi-directional high voltage DC-DC converter 100 with a preset third reference value to determine whether to perform the operation to cope with the bypass. For example, when the calculated value is less than the third reference value, the control circuit 120 may perform the operation to cope with the bypass. On the other hand, when the calculated value is greater than or equal to the third reference value, the control circuit 120 may not perform the operation to cope with the bypass.

In this case, the third reference value may be equal to or smaller than the first reference value and equal to or greater than the second reference value, that is, "second reference value≤third reference value≤first reference value". For example, when the third reference value is equal to the first reference value, the control circuit 120 may immediately perform the operation to cope with the bypass when the occurrence of the bypass is detected. On the other hand, when the third reference value is smaller than the first reference value, even when the bypass is detected, the control circuit 120 may not immediately perform a bypass operation, but the control circuit 120 may perform the operation to cope with the bypass when the value calculated by subtracting the input voltage of the bi-directional high voltage DC-DC converter 100 from the output voltage of the bi-directional high voltage DC-DC converter 100 is less than the third reference value. In addition, when the third reference value is equal to the second reference value, the control circuit 120 may simultaneously perform the bypass avoidance operation and the bypass coping operation. On the other hand, when the third reference value is greater than the second reference value, the control circuit 120 may not perform the bypass avoidance operation even while performing the bypass coping operation, but may perform the bypass avoidance operation when the value calculated by subtracting the input voltage from the output voltage is less than the second reference value.

In addition, after the occurrence of the bypass is detected, the control circuit 120 may detect whether the detected bypass is released or not.

That is, after the occurrence of the bypass is detected, the control circuit 120 may detect whether the bypass is released or not by comparing a value calculated by subtracting the input voltage of the bi-directional high voltage DC-DC converter 100 from the output voltage of the bi-directional high voltage DC-DC converter 100 with a preset fourth reference value. For example, when the calculated value exceeds the fourth reference value, the control circuit 120 may determine that the detected bypass is released. On the other hand, when the calculated value is equal to or less than the fourth reference value, the control circuit 120 may determine that the detected bypass has not been released.

For instance, the fourth reference value may be equal to or greater than the first reference value, that is, "first reference value≤ fourth reference value".

Further, the control circuit 120 may operate or control the bi-directional high voltage DC-DC converter 100 in a normal mode when the detected bypass is released.

For example, when it is determined that the detected bypass is released, the control circuit 120 may turn on the operation of the bi-directional high voltage DC-DC converter 100, provide a BHDC operation on signal and a main relay on request signal to the fuel cell control unit 200, and control the operation of the conversion circuit 110 based only on the first command for limiting the current provided from the fuel cell control unit 200.

Next, a method for operating the bi-directional high voltage DC-DC converter 100 capable of detecting and avoiding bypass according to exemplary embodiments of the present disclosure will be described with reference to FIGS. 3 to 7.

Figure 3:
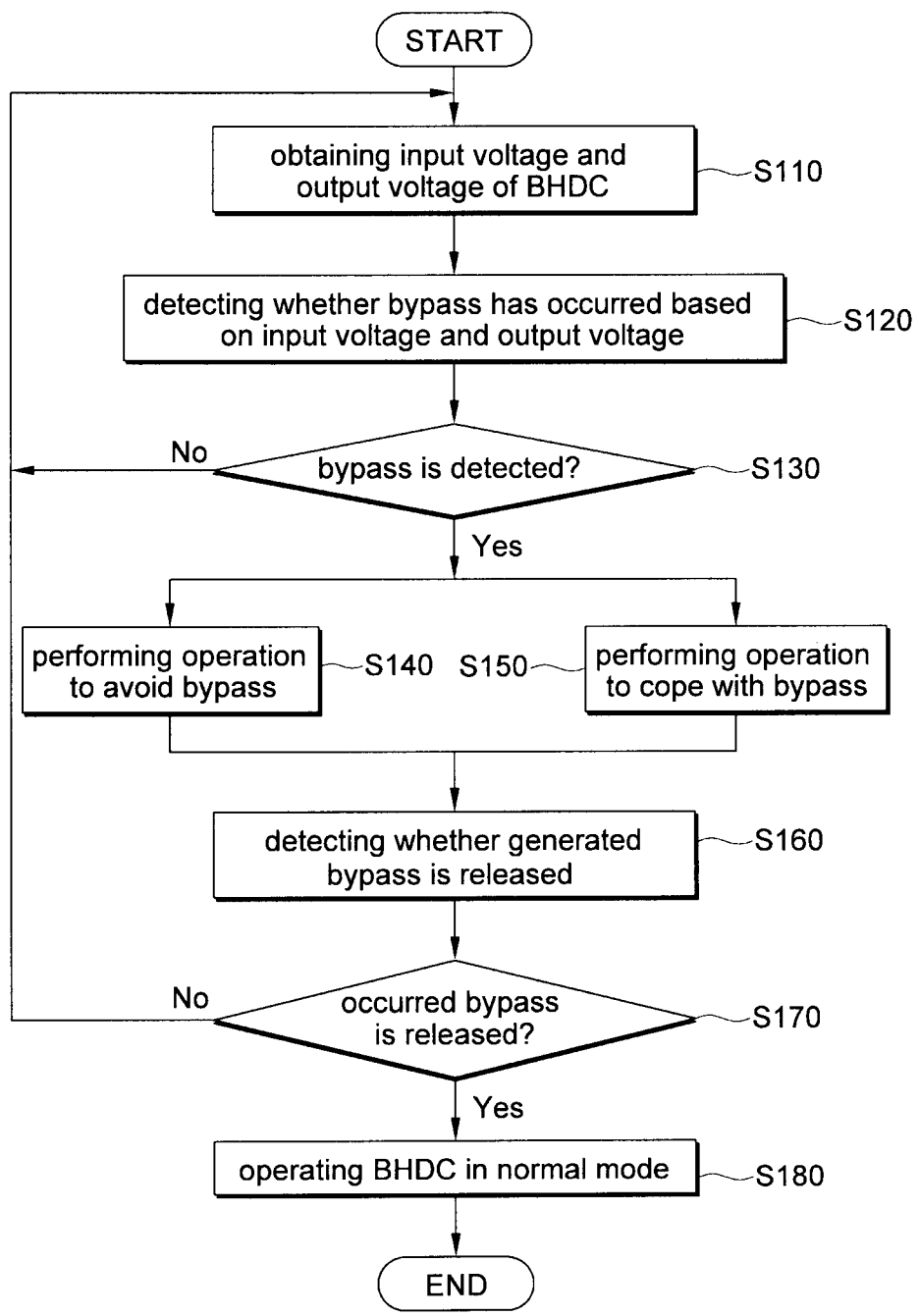
FIG. 3 is a flowchart for illustrating a method of operating a bi-directional high voltage DC-DC converter capable of detecting and avoiding a bypass according to an exemplary embodiment of the present disclosure.
Figure 4:
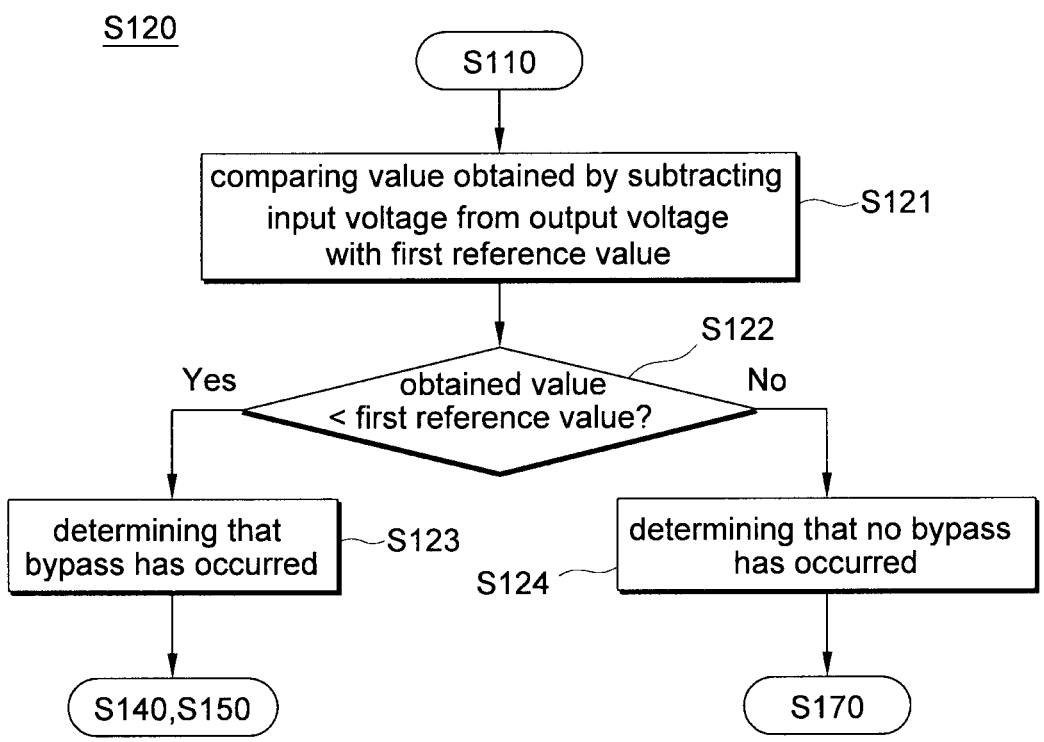
FIG. 4 is a flowchart for showing explaining a step for bypass detection shown in FIG. 3.
Figure 5:
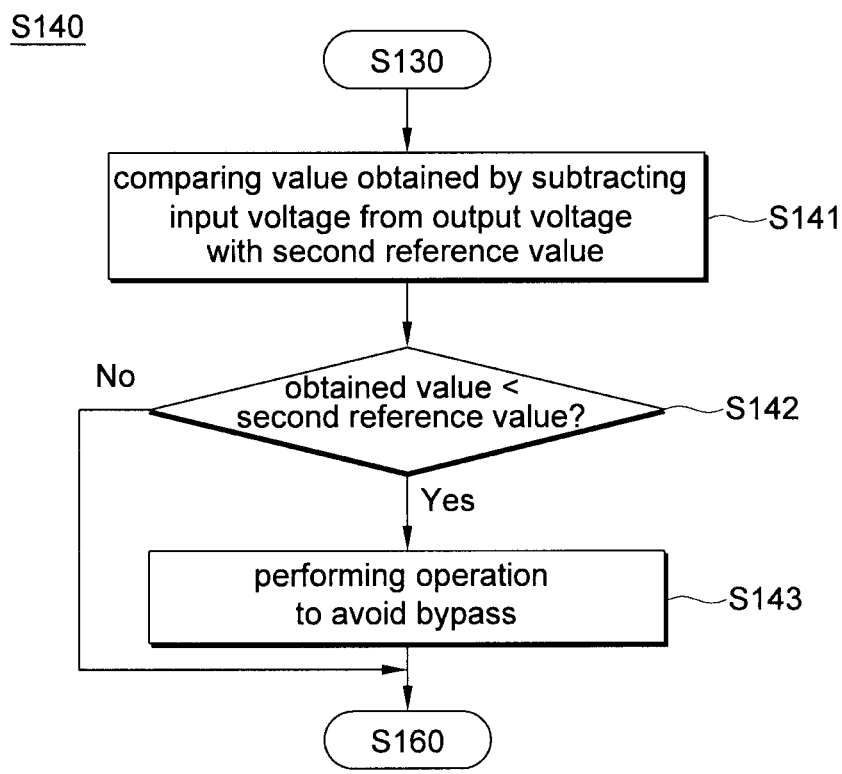
FIG. 5 is a flowchart for illustrating steps of performing a bypass avoidance operation shown in FIG. 3.
Figure 6:
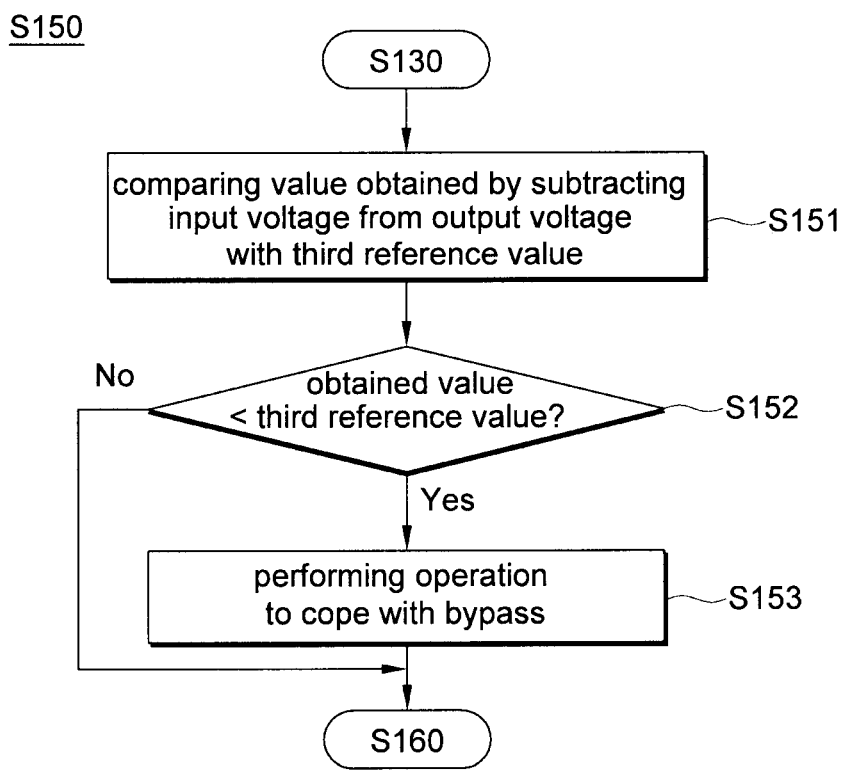
FIG. 6 is a flowchart for showing steps of performing a bypass coping operation shown in FIG. 3.
Figure 7:
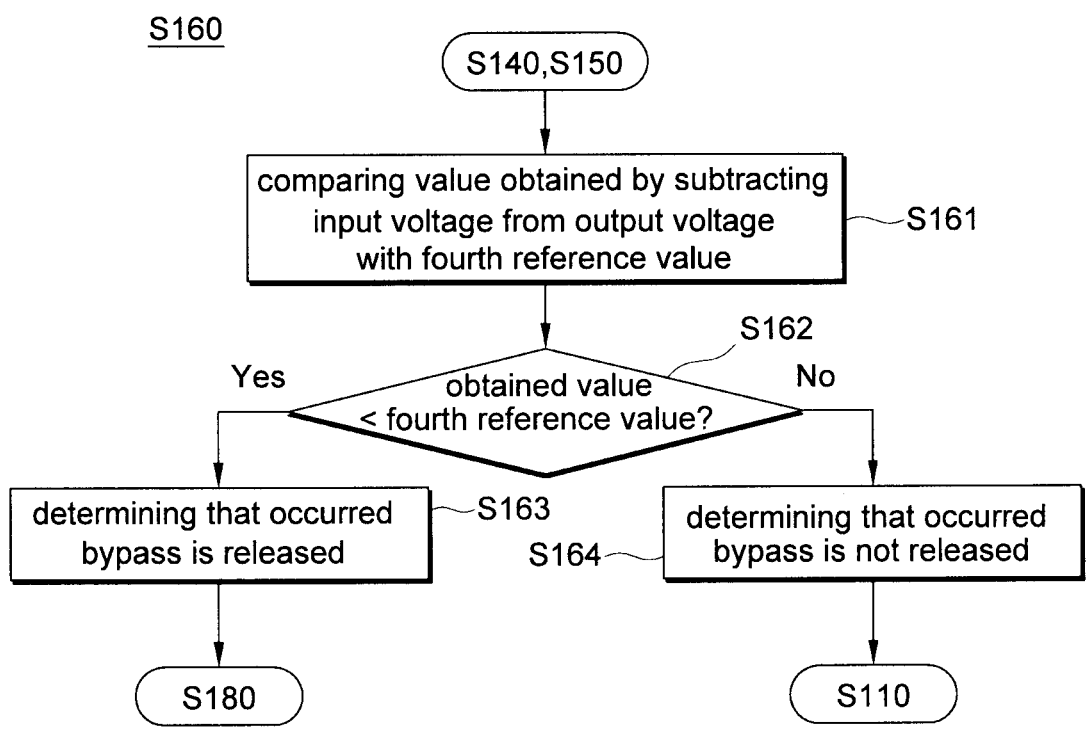
FIG. 7 is a flowchart for illustrating steps of detecting whether a bypass is released or not shown in FIG. 3.

FIG. 3 is a flowchart for showing a method of operating a bi-directional high voltage DC-DC converter capable of detecting and avoiding a bypass according to an exemplary embodiment of the present disclosure, FIG. 4 is a flowchart for illustrating a step for bypass detection shown in FIG. 3, FIG. 5 is a flowchart for showing steps of performing a bypass avoidance operation shown in FIG. 3, FIG. 6 is a flowchart for illustrating steps of performing a bypass coping operation shown in FIG. 3, and FIG. 7 is a flowchart for showing steps of detecting whether a bypass is released or not shown in FIG. 3.

Referring to FIG. 3, the bi-directional high voltage DC-DC converter 100 may obtain or receive an input voltage and an output voltage of the bi-directional high voltage DC-DC converter 100 (Step S110).

Then, the bi-directional high voltage DC-DC converter 100 may detect whether a bypass has occurred based on the input voltage and the output voltage of the bi-directional high voltage DC-DC converter 100 (Step S120).

For example, referring to FIG. 4, the bi-directional high voltage DC-DC converter 100 may compare a value calculated by subtracting the input voltage of the bi-directional high voltage DC-DC converter 100 from the output voltage of the bi-directional high voltage DC-DC converter 100 with a first reference value (Step S121). When the value calculated calculated by subtracting the input voltage of the bi-directional high voltage DC-DC converter 100 from the output voltage of the bi-directional high voltage DC-DC converter 100 is less than the first reference value (Yes in Step S122), the bi-directional high voltage DC-DC converter 100 may determine that the bypass has occurred (Step S123). On the other hand, when the calculated value is greater than or equal to the first reference value (No in Step S122), the bi-directional high voltage DC-DC converter 100 may determine that no bypass has occurred (Step S124).

For instance, when it is determined that the bypass has occurred, the bi-directional high voltage DC-DC converter 100 may increase the number of bypass occurrences by adding 1 to the current value of the number of bypass occurrences, and when it is determined that no bypass has occurred, the bi-directional high voltage DC-DC converter 100 may reduce the number of bypass occurrences by subtracting 1 from the current value of the number of bypass occurrences.

Referring back to FIG. 3, when the bypass is detected (Yes in Step S130), the bi-directional high voltage DC-DC converter 100 may perform an operation for avoiding the bypass (Step S140).

For example, the bi-directional high voltage DC-DC converter 100 may obtain a second command for limiting the current by using a bypass avoidance value based on a first command for limiting the current provided from the fuel cell control unit (FCU) 200, and control the operation of the bi-directional high voltage DC-DC converter 100 based on the second command for limiting the current.

In other words, the bi-directional high voltage DC-DC converter 100 may obtain the second command for limiting the current by increasing the first command for limiting the current using the bypass avoidance value, and control the operation of the bi-directional high voltage DC-DC converter 100 using the second command for limiting the current. In this case, the bi-directional high voltage DC-DC converter 100 may obtain the second command for limiting the current within the maximum current limit value.

In this case, the bi-directional high voltage DC-DC converter 100 may obtain the bypass avoidance value based on the first command for limiting the current. For instance, the bi-directional high voltage DC-DC converter 100 may obtain the bypass avoidance value corresponding to the first command for limiting the current by using bypass avoidance information in which bypass avoidance values are stored for each command for limiting the current. In addition, the bi-directional high voltage DC-DC converter 100 may obtain the bypass avoidance value using at least one of the input voltage of the bi-directional high voltage DC-DC converter 100, the output voltage of the bi-directional high voltage DC-DC converter 100, the temperature of the bi-directional high voltage DC-DC converter 100, the output current of the high voltage battery 400 connected to the bi-directional high voltage DC-DC converter 100, and the output current of the bi-directional high voltage DC-DC converter 100. As a matter of course, the bi-directional high voltage DC-DC converter 100 may obtain the bypass avoidance value using a preset specific value.

In this case, when the occurrence of the bypass is detected, the bi-directional high voltage DC-DC converter 100 may determine whether to perform the bypass avoidance operation based on the input voltage and the output voltage of the bi-directional high voltage DC-DC converter 100. For example, referring to FIG. 5, the bi-directional high voltage DC-DC converter 100 may compare a value calculated by subtracting the input voltage of the bi-directional high voltage DC-DC converter 100 from the output voltage of the bi-directional high voltage DC-DC converter 100 with a second reference value (Step S141). When the value calculated by subtracting the input voltage of the bi-directional high voltage DC-DC converter 100 from the output voltage of the bi-directional high voltage DC-DC converter 100 is less than the second reference value (Yes in Step S142), the bi-directional high voltage DC-DC converter 100 may perform the bypass avoidance operation to avoid the bypass (Step S143). On the other hand, when the calculated value is equal to or greater than the second reference value, the bi-directional high voltage DC-DC converter 100 may not perform the bypass avoidance operation to avoid the bypass.

Referring back to FIG. 3, when the occurrence of the bypass is detected (Yes in Step S130), the bi-directional high voltage DC-DC converter 100 may perform an operation to cope with the bypass (Step S150).

For instance, the bi-directional high voltage DC-DC converter 100 may perform the operation to cope with the bypass by turning off the operation of the bi-directional high voltage DC-DC converter 100, storing a data trouble code (DTC), and providing a BHDC operation off signal and a main relay off request signal to the fuel cell control unit 200

In this case, the bi-directional high voltage DC-DC converter 100 may perform the operation to cope with the bypass when the occurrences of the bypass are detected more than a preset reference number of times.

Further, when the occurrence of the bypass is detected, the bi-directional high voltage DC-DC converter 100 may determine whether to perform the operation to cope with the bypass based on the input voltage and the output voltage of the bi-directional high voltage DC-DC converter 100. For example, referring to FIG. 6, the bi-directional high voltage DC-DC converter 100 may compare a value calculated by subtracting the input voltage of the bi-directional high voltage DC-DC converter 100 from the output voltage of the bi-directional high voltage DC-DC converter 100 with a third reference value (Step S151). As a result of the comparison, when the value calculated by subtracting the input voltage of the bi-directional high voltage DC-DC converter 100 from the output voltage of the bi-directional high voltage DC-DC converter 100 is less than the third reference value (Yes in Step S152), the bi-directional high voltage DC-DC converter 100 may perform the operation to cope with the bypass (Step S153). On the other hand, when the calculated value is equal to or greater than the third reference value, the bi-directional high voltage DC-DC converter 100 may not perform the operation to cope with the bypass.

Thereafter, referring back to FIG. 3, the bi-directional high voltage DC-DC converter 100 may detect whether the bypass detected at Step S130 is released or not (Step S160).

For instance, referring to FIG. 7, after the occurrence of the bypass is detected, the bi-directional high voltage DC-DC converter 100 may compare a value calculated by subtracting the input voltage of the bi-directional high voltage DC-DC converter 100 from the output voltage of the bi-directional high voltage DC-DC converter 100 with a fourth reference value (Step S161). As a result of the comparison, when the value calculated by subtracting the input voltage of the bi-directional high voltage DC-DC converter 100 from the output voltage of the bi-directional high voltage DC-DC converter 100 exceeds a fourth reference value (Yes in Step S162), the bi-directional high voltage DC-DC converter 100 may determine that the detected bypass is released (Step S163). On the other hand, when the calculated value is equal to or less than the four reference value (No in Step S162), the bi-directional high voltage DC-DC converter 100 may determine that the detected bypass is not released (Step S164).

When it is determined that the detected bypass is released (Yes in Step S170), the bi-directional high voltage DC-DC converter 100 may operate the bi-directional high voltage DC-DC converter 100 in a normal mode (Step S180).

For example, when it is determined that the detected bypass is released, the bi-directional high voltage DC-DC converter 100 may turn on the operation of the bi-directional high voltage DC-DC converter 100, provide a BHDC operation on signal and a main relay on request signal to the fuel cell control unit 200, and control the operation of the conversion circuit 110 based only on the first command for limiting the current provided from the fuel cell control unit 200.

Even though all components constituting the above-described embodiments of the present disclosure are described as being combined or operated as one, the present disclosure is not necessarily limited to the embodiments. That is, within the scope of the object of the present disclosure, one or more of the components may be selectively combined to operate. In addition, although all of the components may each be implemented as independent hardware, some or all of the components may be selectively combined and implemented as a computer program having program modules that perform some or all of the combined functions in one or a plurality of hardware. Further, such a computer program may be stored in computer readable media such as USB memory, CD disk, flash memory, and the like, and may be read and executed by a computer to implement the embodiments of the present disclosure. The recording medium of a computer program may include a magnetic recording medium, an optical recording medium, and the like.

The above description is merely an example of the technical idea of the present disclosure, and those skilled in the art to which the present disclosure pertains may be able to make various modifications, changes, and substitutions without departing from the essential characteristics of the present disclosure. Accordingly, the embodiments disclosed in the present disclosure and the accompanying drawings are not intended to limit the technical idea of the present disclosure, but to explain the technical idea of the present disclosure, and the scope of the technical idea of the present disclosure is not limited by the embodiments and the accompanying drawings. The protection scope of the present disclosure should be construed according to the following claims, and all technical ideas within the equivalent range should be construed as being included in the scope of the present disclosure.

What is claimed is:

1. A bi-directional high voltage DC-DC converter to be connected to a fuel cell control unit installed in a fuel cell electric vehicle, the bi-directional high voltage DC-DC converter comprising:
   a control circuit configured to detect whether a bypass in the bi-directional high voltage DC-DC converter has occurred, based on an input voltage and an output voltage of the bi-directional high voltage DC-DC converter; and
   a conversion circuit configured to convert a voltage according to control of the control circuit,
   wherein the bypass comprises a case in which current control of the bi-directional high voltage DC-DC converter is unavailable or overcurrent occurs in the bi-directional high voltage DC-DC converter, and wherein when occurrence of the bypass is detected, the control circuit is configured to, using a bypass avoidance value based on a first command for limiting a current received from the fuel cell control unit, obtain a second command for limiting the current by adding the bypass avoidance value to the first command for limiting the current, and control an operation of the conversion circuit based on the second current limiting command.

2. The bi-directional high voltage DC-DC converter of claim 1, wherein:

the control circuit is configured to determine that the bypass has occurred when a difference between the input voltage and the output voltage of the bi-directional high voltage DC-DC converter is less than a preset first reference value.

3. The bi-directional high voltage DC-DC converter of claim 2, wherein the control circuit is configured to perform an operation for stopping the bypass when occurrence of the bypass is detected.

4. The bi-directional high voltage DC-DC converter of claim 3, wherein the control circuit is configured to, when the occurrence of the bypass is detected, perform the operation for stopping the bypass when the difference between the input voltage and the output voltage of the bi-directional high voltage DC-DC converter is less than a preset second reference value, and the second reference value is set to be equal to or smaller than the first reference value.

5. The bi-directional high voltage DC-DC converter of claim 4, wherein the control circuit is configured to, when the occurrence of the bypass is detected, perform an operation for coping with the bypass.

6. The bi-directional high voltage DC-DC converter of claim 5, wherein the control circuit is configured to turn off an operation of the bi-directional high voltage DC-DC converter, store a data trouble code, and provide a signal for operation off of the bi-directional high voltage DC-DC converter and a signal for requesting main relay off to the fuel cell control unit to perform the operation for coping with the bypass.

7. The bi-directional high voltage DC-DC converter of claim 6, wherein the control circuit is configured to perform the operation for coping with the bypass when the occurrence of the bypass is detected more than a preset reference number of times.

8. The bi-directional high voltage DC-DC converter of claim 5, wherein the control circuit is configured to, when the occurrence of the bypass is detected, perform the operation for coping with the bypass when the difference between the input voltage and the output voltage of the bi-directional high voltage DC-DC converter is less than a preset third reference value, and the third reference value is set to be equal to or less than the first reference value and equal to or greater than the second reference value.

9. The bi-directional high voltage DC-DC converter of claim 8, wherein the control circuit is configured to, after the occurrence of the bypass is detected, detect whether the bypass is released or not.

10. The bi-directional high voltage DC-DC converter of claim 9, wherein:

the control circuit is configured to determine that the bypass is released when the difference between the input voltage and the output voltage of the bi-directional high voltage DC-DC converter exceeds a preset fourth reference value after the occurrence of the bypass is detected, and the fourth reference value is set to be equal to or greater than the first reference value.

11. The bi-directional high voltage DC-DC converter of claim 10, wherein the control circuit is configured to, when the bypass is released, turn on the operation of the bi-directional high voltage DC-DC converter, transmit a signal for operation on of the bi-directional high voltage DC-DC converter and a signal for requesting main relay on to the fuel cell control unit, and control an operation of the conversion circuit based on the first command for limiting the current provided from the fuel cell control unit.

12. The bi-directional high voltage DC-DC converter of claim 1, wherein the control circuit is configured to obtain the bypass avoidance value based on the first command for limiting the current.

13. The bi-directional high voltage DC-DC converter of claim 1, wherein the control circuit is configured to obtain the bypass avoidance value using at least one of the input voltage of the bi-directional high voltage DC-DC converter, the output voltage of the bi-directional high voltage DC-DC converter, a temperature of the bi-directional high voltage DC-DC converter, and an output current of a battery connected to the bi-directional high voltage DC-DC converter, and an output current of the bi-directional high voltage DC-DC converter.

14. A method of operating a bi-directional high voltage DC-DC converter connected to a fuel cell control unit installed in a fuel cell electric vehicle, the method comprising:

obtaining an input voltage and an output voltage of the bi-directional high voltage DC-DC converter; and detecting, based on the input voltage and the output voltage of the bi-directional high voltage DC-DC converter, whether a bypass in the bi-directional high voltage DC-DC converter has occurred, wherein the bypass comprises a case in which current control of the bi-directional high voltage DC-DC converter is unavailable or overcurrent occurs in the bi-directional high voltage DC-DC converter, and wherein the method further comprises, when occurrence of the bypass is detected:

using a bypass avoidance value based on a first command for limiting a current received from the fuel cell control unit, obtaining a second command for limiting the current by adding the bypass avoidance value to the first command for limiting the current; and controlling an operation of the bi-directional high voltage DC-DC converter based on the second command for limiting the current.

15. The method of claim 14, wherein:

the detecting of whether the bypass has occurred includes determining that the bypass has occurred when a difference between the input voltage and the output voltage of the bi-directional high voltage DC-DC converter is less than a preset first reference value.

16. The method of claim 15, further comprising performing an operation for stopping the bypass when the occurrence of the bypass is detected.

17. The method of claim 16, wherein:

the performing of the operation for stopping the bypass includes:

when the occurrence of the bypass is detected, performing the operation for stopping the bypass when the difference between the input voltage and the output voltage of the bi-directional high voltage DC-DC converter is less than a preset second reference value, and the second reference value is set to be equal to or smaller than the first reference value.

* * * * *